INVENTOR.
CHARLES BANCROFT
BY
ATTORNEYS

Sept. 16, 1958     C. BANCROFT     2,852,007
ROTARY PISTON ENGINE
Filed Oct. 28, 1957     8 Sheets-Sheet 3

INVENTOR.
CHARLES BANCROFT
BY
ATTORNEYS

Sept. 16, 1958 C. BANCROFT 2,852,007
ROTARY PISTON ENGINE
Filed Oct. 28, 1957 8 Sheets-Sheet 7

INVENTOR.
CHARLES BANCROFT
BY
ATTORNEYS

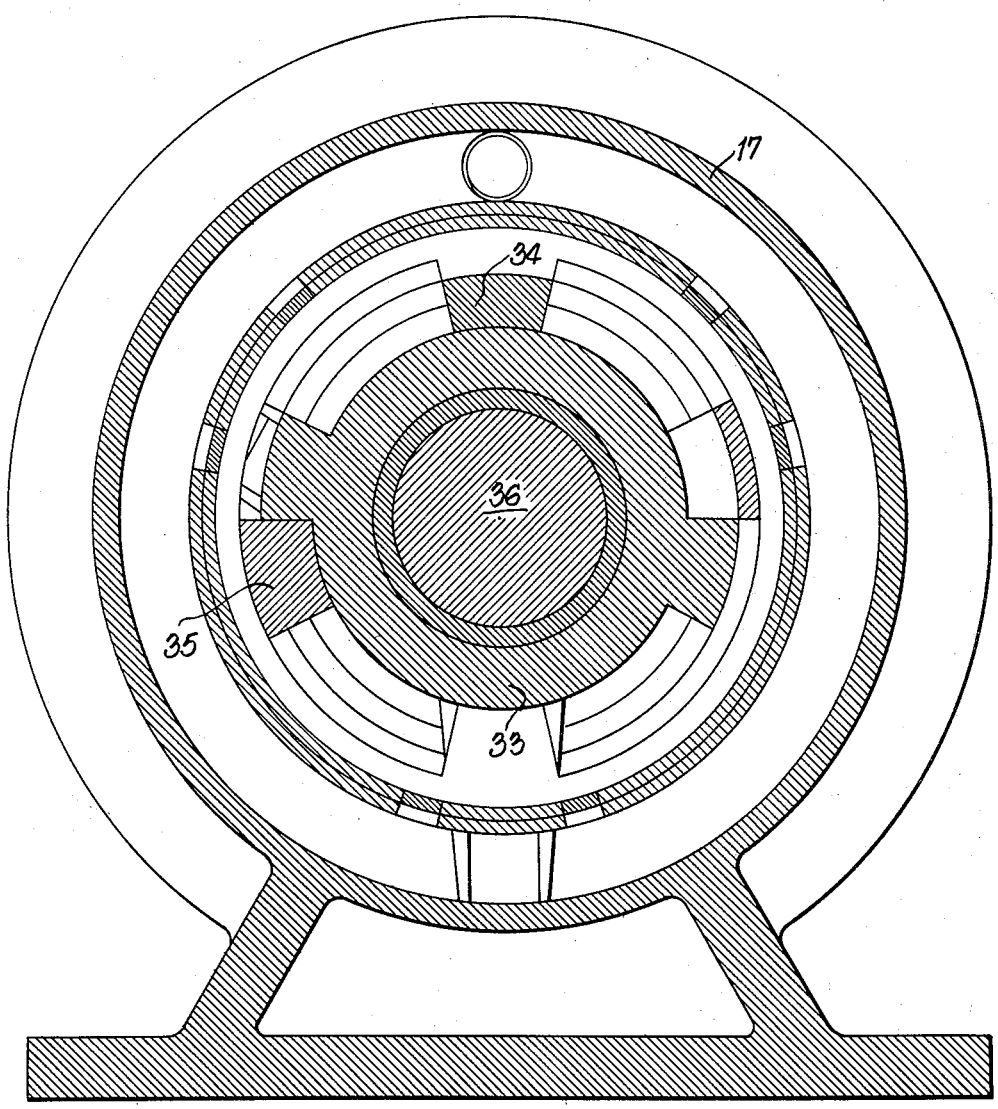

United States Patent Office 2,852,007
Patented Sept. 16, 1958

2,852,007

ROTARY PISTON ENGINE

Charles Bancroft, New Canaan, Conn.

Application October 28, 1957, Serial No. 692,606

12 Claims. (Cl. 123—11)

This invention relates to a rotary piston engine of the internal combustion type which has all of the advantages inherent in such engines. These advantages include extreme compactness for a given displacement which makes them particularly adaptable for use in conjunction with power-increasing devices such as turbo- super chargers and the like which are themselves inherently relatively compact but which result in considerable bulk and weight when used with ordinary reciprocating piston engines.

These inherent advantages of the rotary piston engine have not heretofore been commercially exploited due to what many skilled in the art have considered to be two outstanding disadvantages. One of these disadvantages is the practical difficulty encountered in tightly sealing the rotary pistons against gas blow-by, which with prior art designs of rotary piston engines has interfered with their operation. The other disadvantage is the complexity of the parts required to control the acceleration and deceleration of the rotary pistons, which implies a degree of rapid wear and possible breakages suggesting an unduly short service life.

In view of the foregoing it is the primary object of the present invention to provide a rotary piston engine which overcomes the above disadvantages to a degree sufficient to make the engine commercially practical to a greater apparent degree than has heretofore been the case. It is, of course, desired to attain this objective while retaining all of the inherent advantages of rotary piston engines in general.

A specific example of a rotary piston, internal combustion engine embodying the principles of the present invention is illustrated by the accompanying drawings in which:

Fig. 8 is a vertical cross section taken on the line 8—8 in Fig. 1.

The illustrated engine may be used either with a carburetor and spark plugs for use with a highly volatile fuel such as gasoline, or without a carburetor and using solid fuel injectors in which case ignition is effected by the high compression thereby permitting the use of fuel of lower volatility such for example as diesel oil. In the latter instance spark ignition or glow plug ignition may also be used.

In any event the intake for the engine is in the form of a generally tubular member 1 having oppositely located radial ports 2 for the rotary piston assembly. The latter includes three pairs of rotary pistons 3, 4 and 5, each pair comprising diametrically opposite rotary pistons internally bearing against the outer periphery of the member 1. In the engine illustrated by the drawings, the pistons decelerate to a minimum when they occupy a horizontal plane and accelerate to a miximum velocity when they reach a vertical plane.

Figure 3:
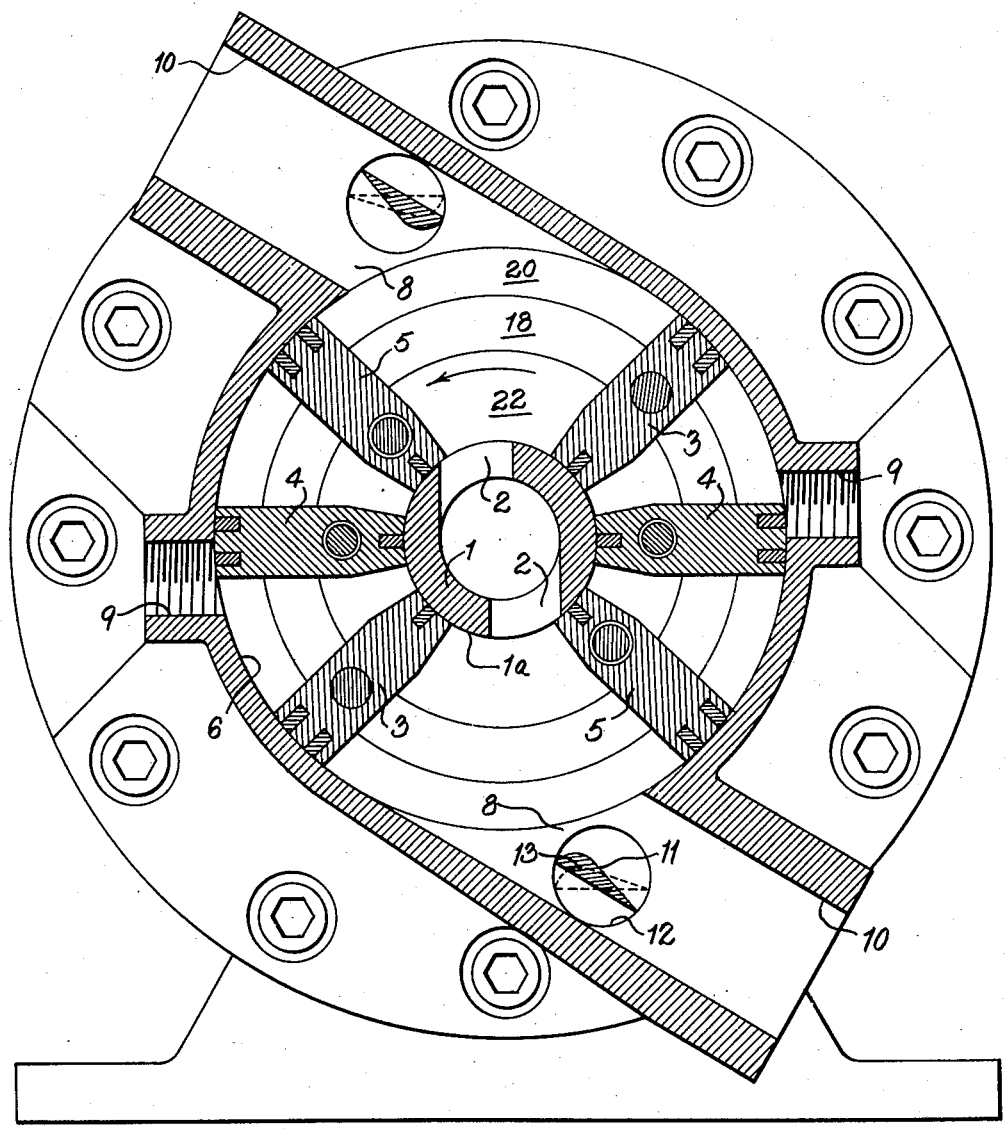
Fig. 3 is a vertical cross section taken on the line 3—3 in Fig. 1, this figure showing the pistons oriented as they appear in Fig. 1.

Thus, in Fig. 3, it can be seen that the pistons 4 are at their point of minimum velocity, the pistons 3 are accelerating to their point of maximum velocity which will be when they are vertical, and the pistons 5 are in their decelerating phase. The rotation is counterclockwise as shown by the curved arrow in Fig. 3.

The rotary pistons operate in an annular chamber, the details of which are described hereinafter. The inner annular chamber wall is formed by the outer surface 1a of the tubular member 1 and the outer annular wall is formed by the annular cylinder wall 6 of the finned cylinder casing 7. Both the member 1 and the casing 7, including its wall 6, are stationary or nonrotative in the normal operation of the engine.

Referring now to Fig. 3 where the pistons 3 are accelerating and the pistons 5 are decelerating the products of combustion have been thrown by centrifugal force through exhaust ports 8 formed in the cylinder wall 6, the momentum of the exhaust gases driving them radially outwardly and serving to reduce the pressure between the pistons 3 and 5 so as to draw in a fresh charge through the ports 2. At lower speeds it may be desirable to provide the engine with a super charger or blower to assist the action just described. Such accessory equipment may be used at all times with the understanding that the inherent nature of the present invention reduces the normal loading placed on such equipment in the case of conventional reciprocating piston engines.

The pistons 4 and 5 have already gone through the above described phase and in Fig. 3 are in the act of compressing the fresh charge. As previously indicated this charge may be an explosive mixture or only air, solid fuel injection being used in the latter instance. In the case of the illustrated engine the casing 7 is provided with threaded openings 9 adapted to receive either spark plugs or solid fuel injectors. Assuming the mixture introduced through the port 2 is explosive and spark plugs are used, it can be seen that ignition of the gases between the pistons 3 and 4 has already occurred. In the case of an air charge and solid fuel injection the injection phase would be just about terminating, although the exact timing will depend on the exact fuel and ignition system used, the service conditions which the engine is expected to encounter and other variables familiar to internal combustion engine designers.

Figure 4:
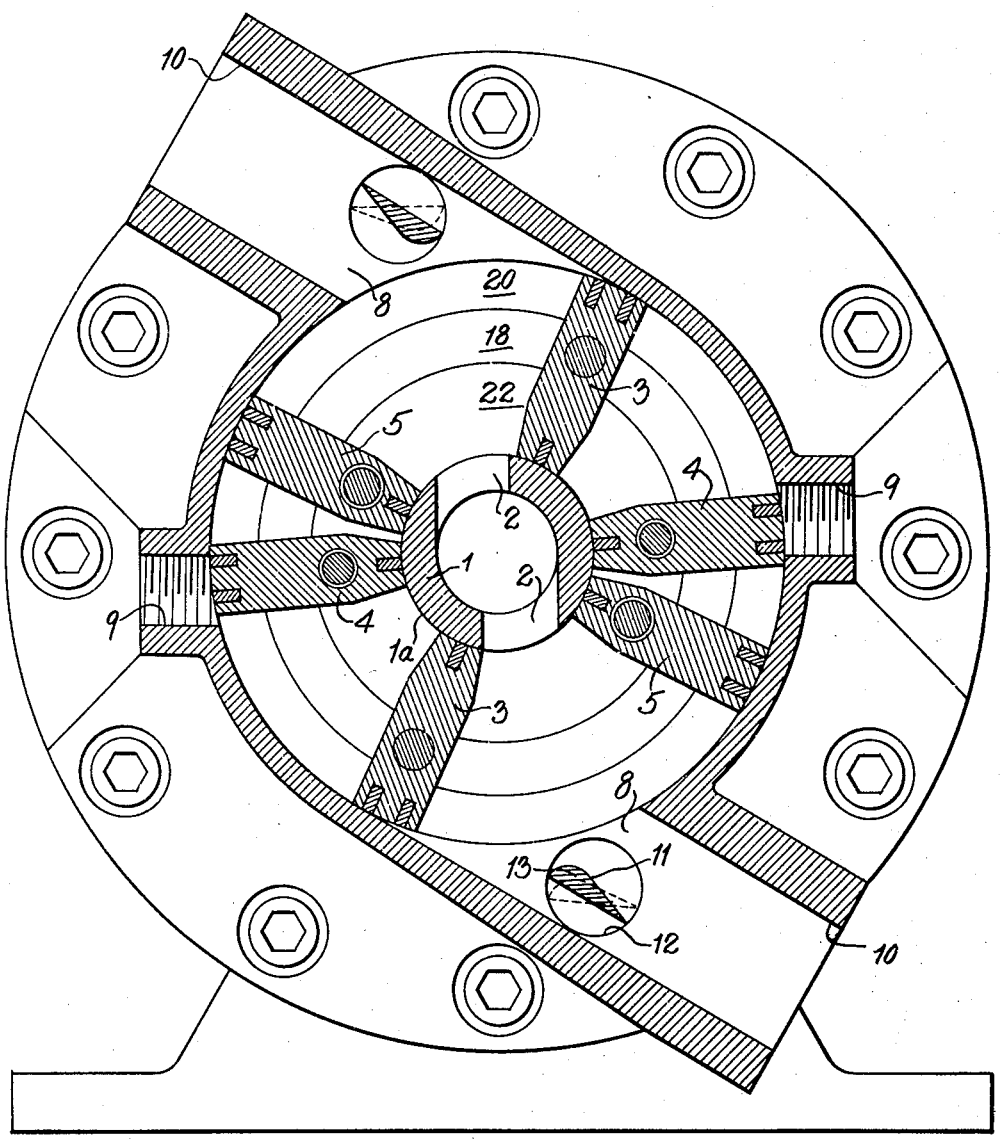
Figs. 4, 5 and 6 show the same cross section as Fig. 3 but with the pistons in each successive figure progressively oriented as required for successive phases of their operation.
Figure 5:
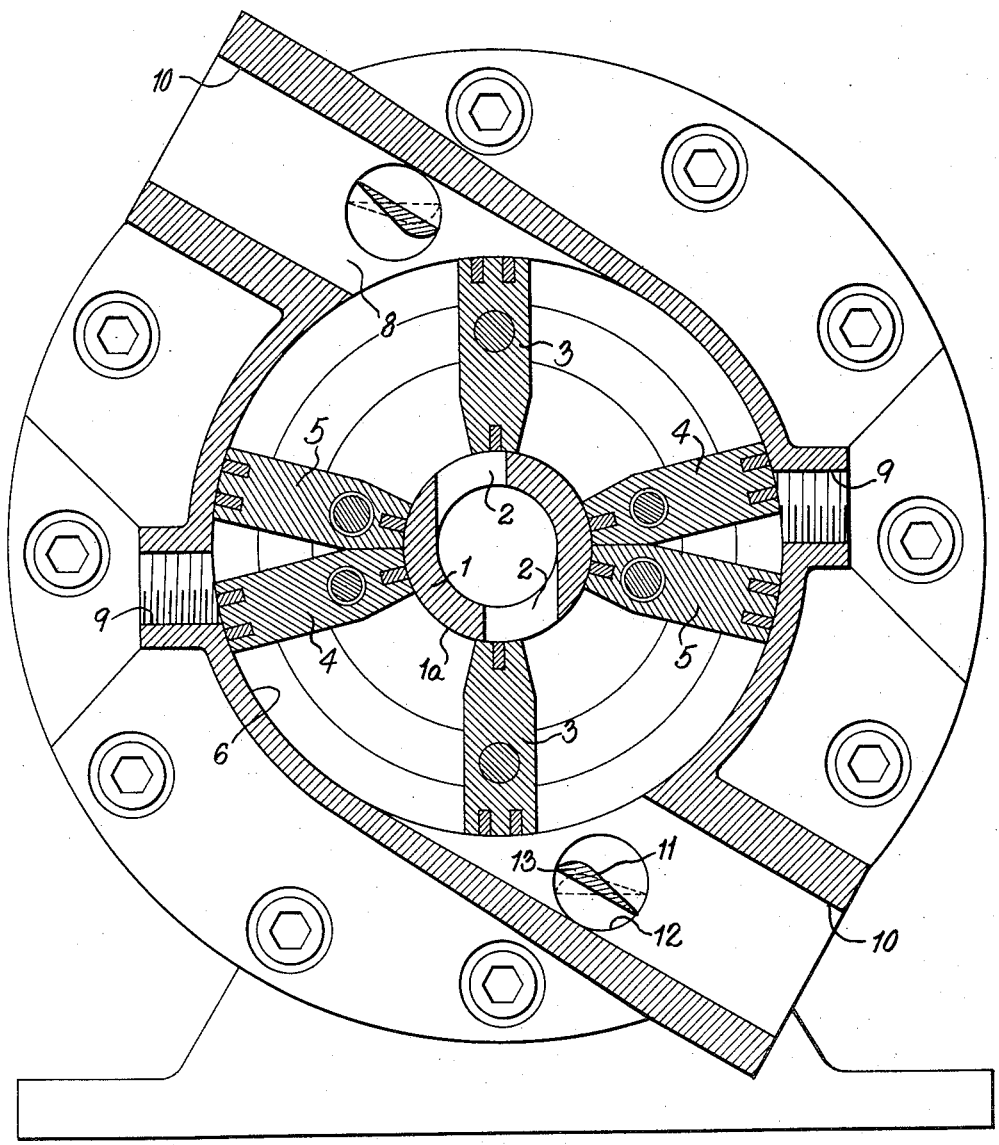
Figure 6:
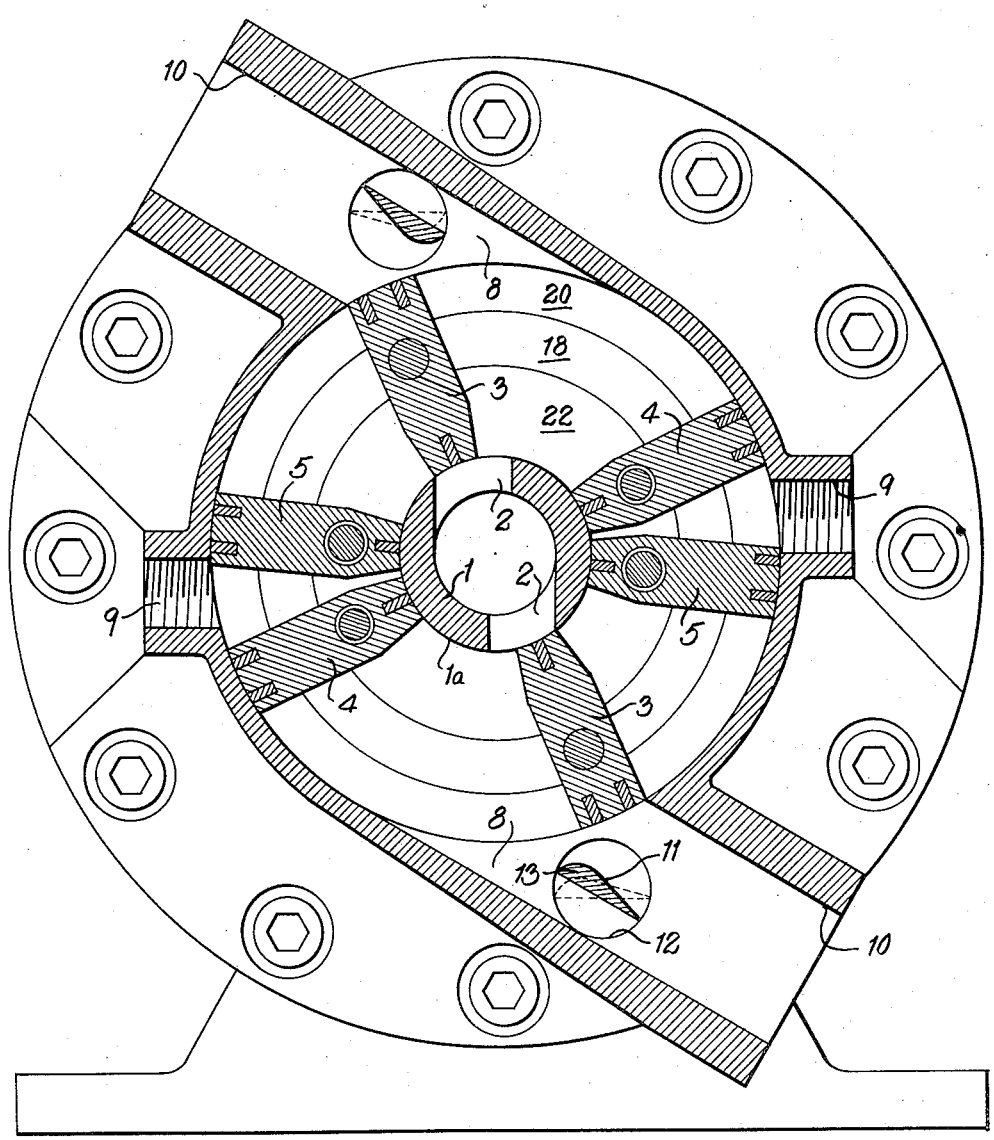
Figure 7:
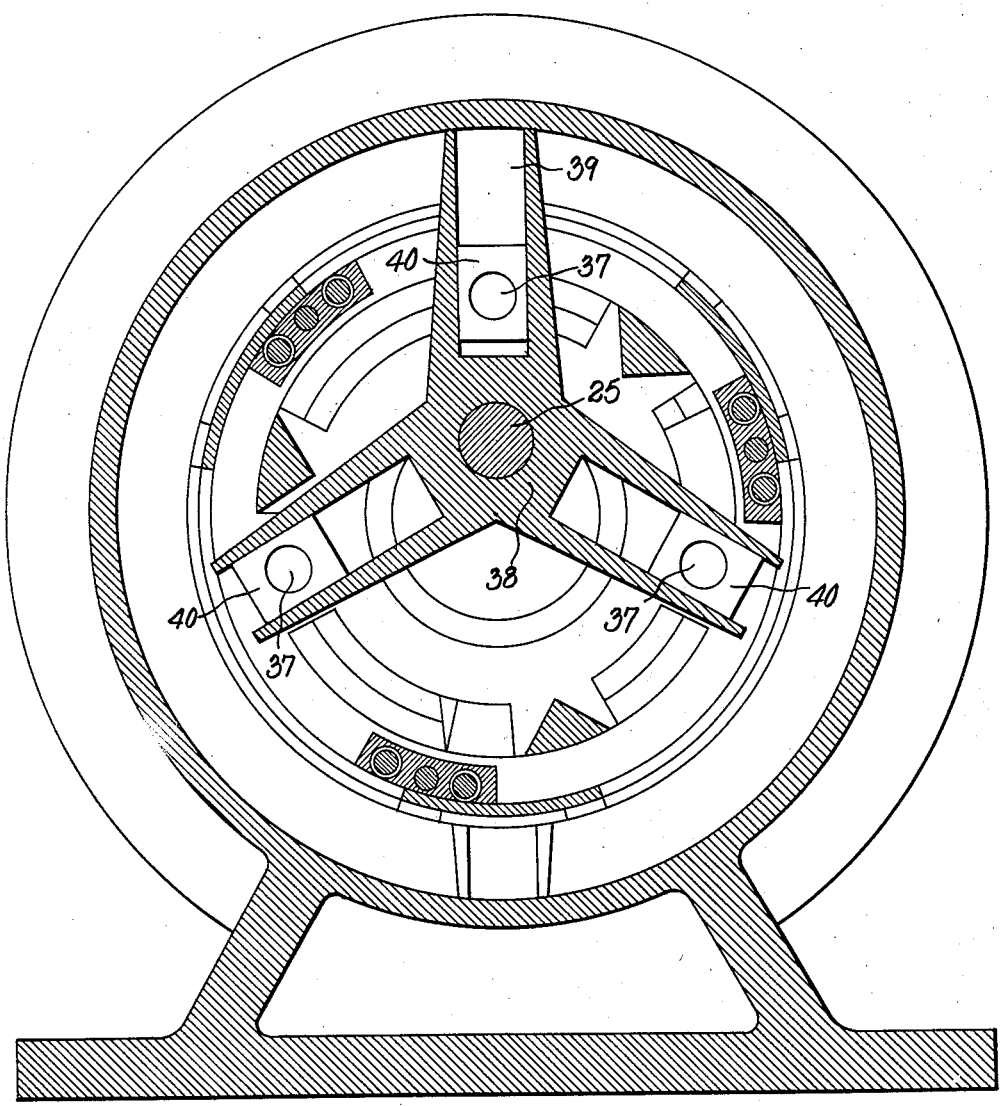
Fig. 7 is a vertical cross section taken on the line 7—7 in Fig. 1.

It can be seen in Fig. 3 that the pistons 3 and 4 are being driven apart by the expanding gases between them and that this action will continue until the pistons 3 begin to uncover the exhaust ports 8 as illustrated in Fig. 4. The pistons 3 initially ride over the ports 8 as the pistons 3 are driven to their maximum velocity. This occurs when the rotary velocity of the gases is at maximum so that as soon as the cylinder wall 6 is opened radially the centrifugal force drives the gases radially outwardly through the ports 8. The velocity of the gases is at this time further increased by the expanded action of the gases. The weight of the moving gases, or momentum, carries them from the engine while reducing the pressure between the pistons 3 and 4 as previously mentioned.

During the above action the pistons 3 are accelerating but at such a rate that when the ports 8 are fully opened the pistons 3 and 4 are at their widest angle of separation even though the pistons 3 decelerate as they continue their rotation towards a horizontal position.

From the foregoing it can be appreciated that from the moment of firing the momentum of the gases urges the pistons 3 toward the ports 8, this action prevailing even before the pistons 3, for example, uncover the ports 8, This action has some tendency to reduce leakage towards the intake ports. Furthermore, the centrifugal action tends to crowd gases toward the periphery of the device which is again away from the intake ports. Still further, at the time of firing as for example between the pistons 3 and 4, the pistons 5 have closed the ports 2 so that leakage of the gases around the pistons 4 can hardly get up to the intake ports 2 because they are closed from such leakage by the pistons 5. Each of these actions tends to reinforce and aid each other so that the piston leakage to be expected when using normal manufacturing tolerances for the moving parts, has little if any effect on the overall operation and efficiency of the engine.

It can be seen from the above how the present invention overcomes the previously mentioned piston blow-by disadvantage of prior art rotary piston engines. With these prior art engines the leakage around the pistons tended to create pressures at the intake ports approaching or substantially equalling the pressures available to drive the intake into the engine, thereby reducing the efficiency of the engine or rendering it inoperative.

As shown by Fig. 3 the ports 8 communicate directly with exhaust passages 10 shown as being cast as part of the casing 7. These passages or stacks 10 are pointed or oriented tangentially with respect to the annular cylinder wall 6 so as to present the minimum resistance to the exhaust gases driving outwardly due to their momentum. Furthermore, this arrangement uses to best advantage the velocity increase obtained by the expansion of the gases as the various pistons first begin to open the ports 8.

Again referring to Fig. 3 it is to be noted than in each exhaust passage 10 a venturi element 11 is adjustably mounted by having its ends located in transversely arranged cylindrical recesses 12. Each venturi element is mounted on a shaft 13 which extends to the left-hand or front end of the engine through the casing 7 so that it is externally accessible as at 13a. In each instance the venturi element 11 extends transversely across the passage 10 relatively close to the port 8 and relatively close to the outer portion of the passage which is tangential with respect to the annular cylinder wall 6.

With the venturi elements turned as shown in solid lines by Fig. 3 the maximum venturi action is obtained. In other words, there is a maximum increase in the velocity of the gases and it is to be noted that this venturi action occurs during the later portion of the exhaust cycle so that the resulting pressure decrease further assists in complete scavenging of the burnt gases and charging of the space vacated thereby with fresh charges. The reason the venturi elements 11 are made adjustable is because with high speed operation there is a possibility of the present invention becoming what might be called over effective. In other words, it may be necessary to deliberately introduce back pressure at the ports 8 to prevent the fresh charge from following the burnt charge through the engine so as to be lost.

Figure 2:
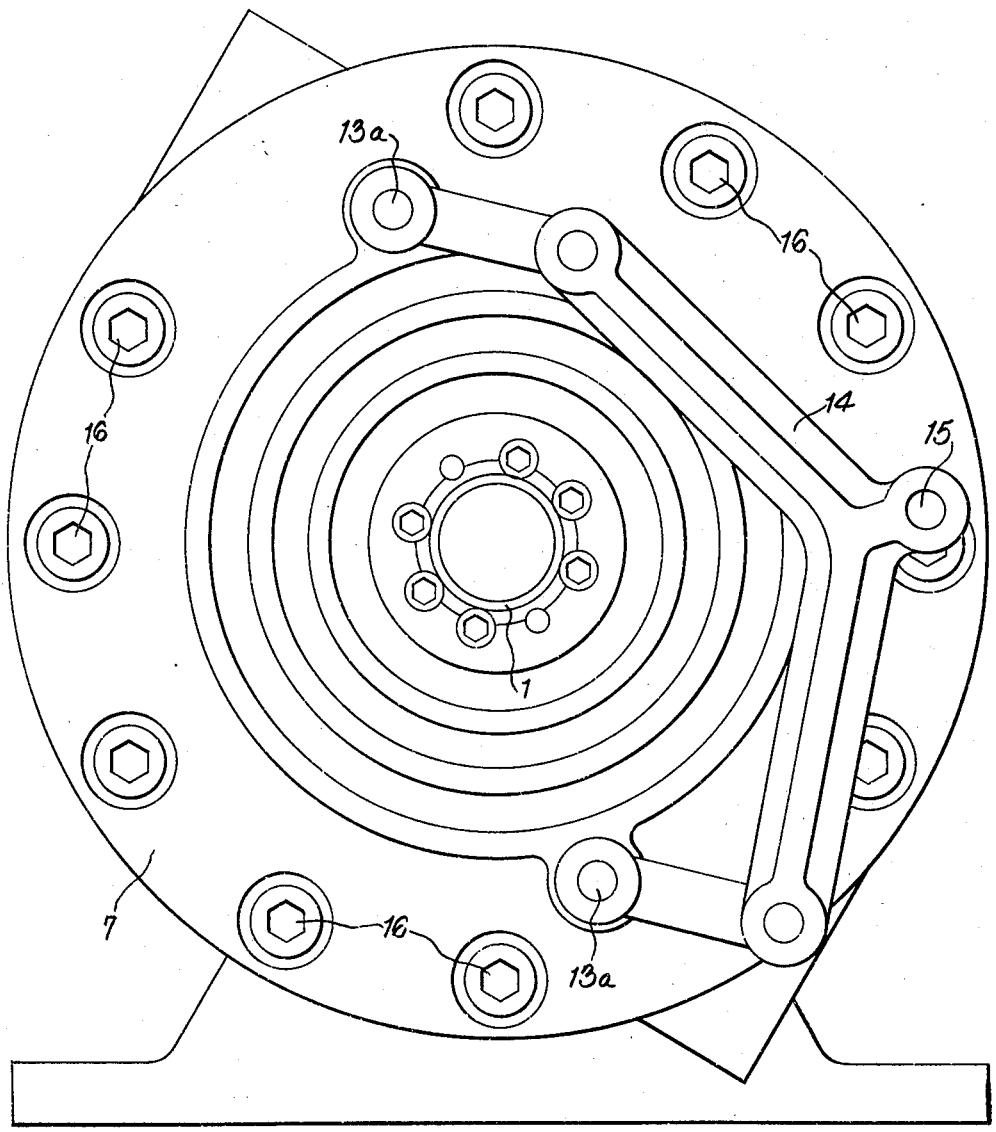
Fig. 2 is an end view of the engine looking at what is the left-hand end in Fig. 1.

As shown by Fig. 2 the externally accessible shafts 13a may be interconnected by a linkage 14 having a connection 15 permitting simultaneous throttling action of the engine's exhaust by appropriate simultaneous rotation of the venturi elements 11 causing the latter to act somewhat like dampers. Just as conventional engines are equipped with automatic spark timing controls, automatic controls may be used to actuate the linkage 14. As shown the linkage may be actuated manually in accordance with the experience of the operator.

It is, of course, possible that the venturi elements 11 may have to be relocated or reshaped or proportioned to meet the demands of different fuels and varying engine operating conditions and the like.

Figure 1:
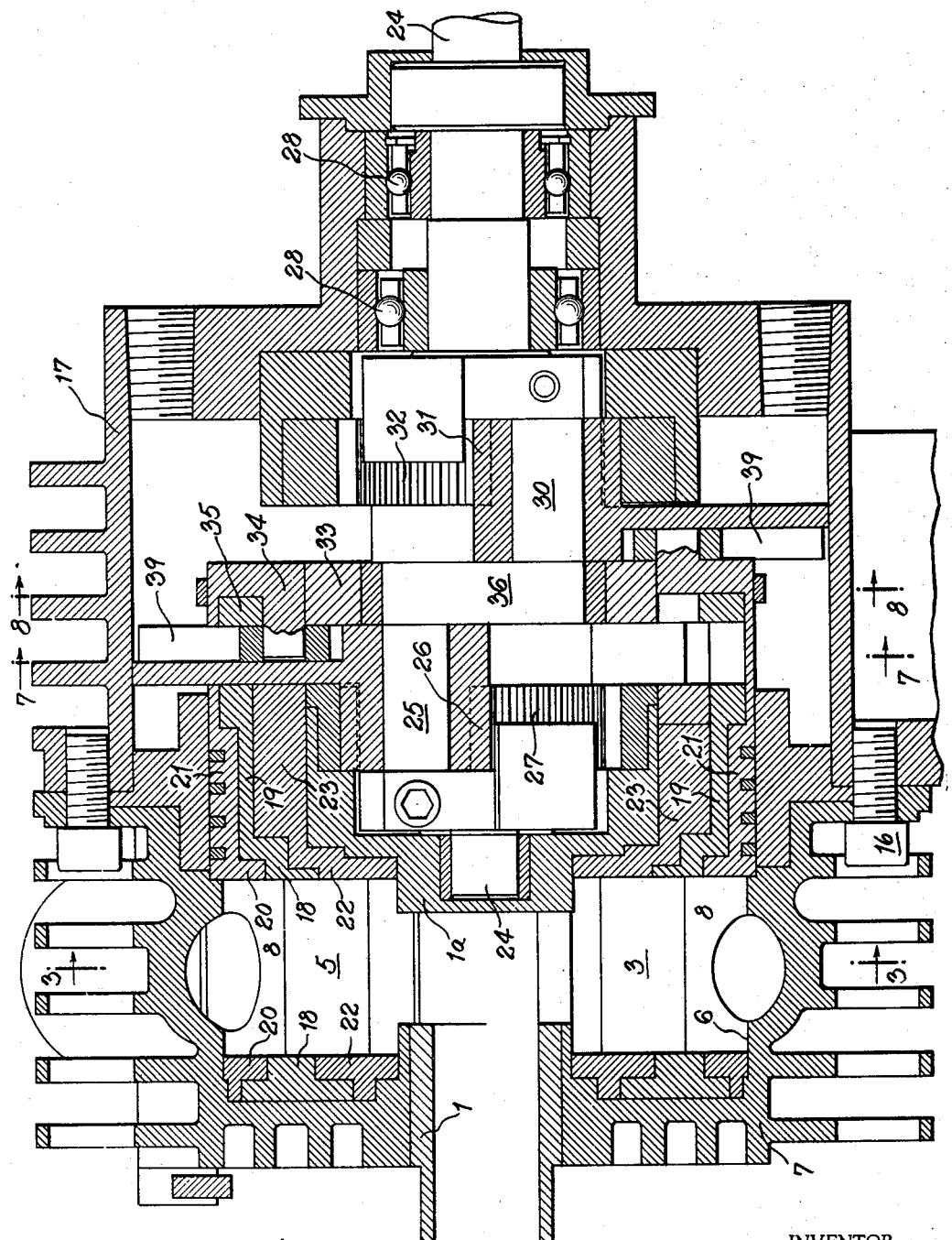
Fig. 1 is a longitudinal section taken on a vertical plane.

Going now to the mechanical elements required to control and to take power from the rotary pistons, it was previously mentioned that the tubular member 1 is immovable with respect to the casing 7 which forms the annular cylinder wall 6. Referring to Fig. 1, the left-hand end and periphery of this casing 7 are cast as one piece which is attached by cap screws 16 to what might be called the crankcase 17. The pistons 3 connect with an annular wall segment 18 which connects integrally with a tubular shaft 19. The pistons 4 connect with annular wall segments 20 which connect integrally with a tubular shaft 21 which encircles the shaft 19. The pistons 5 connect with annular wall segments 22 which integrally connect with a tubular shaft 23 which is encircled by the shaft 19. In each instance the wall segments accelerate and decelerate with the pistons with which they respectively connect.

The tubular member 1 extends inwardly beyond the piston assembly and mounts a bearing for the crankshaft 24 required by devices of this type to control the piston action. The crankshaft 24 has a crankpin 25 on which a pinion 26 is journaled, the tubular member 1 having an enlarged inner end mounting an internal ring gear 27 with which the pinion 26 is meshed. The rear end of the crankshaft 24 is journaled by bearings 28 mounted within the rear extension of the crankcase 17. The crankshaft 24 has a second crankpin 30 providing a throw opposite to that of the crankpin 25 and a second pinion 31 is journaled on this crankpin 30, the internal ring gear 32 with which this pinion 31 meshes being mounted within the casing 17. Both the ring gears 27 and 32 are stationarily held with respect to the casing so as to rotate the pinions 26 and 31 when the crank turns.

The driving rings 33, 34, and 35 for the respective piston sets 3, 4 and 5 are rotatively mounted on bearing 36 located on the crankshaft 24 between the crank pins 25 and 30. Each of these piston driving rings 33, 34 and 35 is provided with two bearing pins 37 which are mounted 180 degrees apart and on opposite sides of each ring, such that each ring has one pin for each connecting member 38. One connecting member 38 is rotatively mounted on each of the crankpins 25 and 30. These connecting members 38, which are radially slotted as at 39, serve to interconnect each piston set with its respective driving ring.

Each of the connecting members 38 is individually linked to each of the piston driving rings 33, 34 and 35 by means of pillow block bearings 40 which ride in the slotted guideways 39 in each connecting member 38. These pillow block bearings 40 are rotatively mounted on the bearing pins 37.

As can readily be seen from the drawings although the two connecting members 38 rotate on different axes, the arrangement described effectively couples them together and confines the stresses involved in the acceleration and deceleration of the rotary pistons 3, 4 and 5 to these members and to the crankshaft.

As shown by the drawings, in every instance each piston is diametrically balanced with respect to the annular chamber in which it rotates. In other words, each piston appears in duplicate or as a pair which work together. Therefore, the spaces defined between the pistons operate in a diametrically balanced manner. Thus, compression between two pistons on one side is balanced by corresponding compression on the opposite side and the operation is symmetric. In this manner the bearing loads on the rotating parts is reduced.

The chamber in which the pistons operate is cooled during operation of the engine by the direct application of cooling means, such for example as the fins or cooling chambers illustrated in Figure 1. The inner wall of the chamber is cooled by the incoming fresh gases and the other side is cooled by the oil in which the driving parts of the engine are immersed. This oil is in turn cooled by cooling means applied to the outer case surrounding these parts.

I claim:

1. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, means for introducing a fluid into said chamber through said tubular member at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, and means interconnecting said pistons with a crankshaft whereby motion of said pistons is transmitted to said crankshaft.

2. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, means for introducing a fluid into said chamber through said tubular member at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, and means interconnecting said pistons with a crankshaft whereby motion of said piston is transmitted to said crankshaft, the second named means including an ignition means, said fluid being a combustible mixture when fed to said chamber.

3. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, means for introducing a fluid into said chamber through said tubular member at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, and means interconnecting said pistons with a crankshaft whereby motion of said pistons is transmitted to said crankshaft, the second means including a fuel injector means, said fluid containing oxygen when fed to said chamber.

4. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, means for introducing a fluid into said chamber through said tubular member at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, exhaust passages extending tangentially from said tubular casing and interconnecting with said outlet ports in said tubular casing for discharging said expanded fluid outwardly from the outer periphery of said chamber, and means interconnecting said pistons with a crankshaft whereby motion of said pistons is transmitted to said crankshaft.

5. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, means for introducing a fluid into said chamber through said tubular member at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, exhaust passages extending tangentially from said tubular casing and interconnecting with said outlet ports in said tubular casing for discharging said expanded fluid outwardly from the outer periphery of said chamber, adjustable venturi means in said exhaust passages to increase the velocity of said discharged fluid, and means interconnecting said pistons with a crankshaft whereby motion of said pistons is transmitted to said crankshaft.

6. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, means for introducing a fluid into said chamber through said tubular member at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, a double throw crankshaft rotatably attached to said tubular member and forming an axial extension thereof, and means interconnecting said pistons with said crankshaft whereby motion of said pistons is transmitted to said crankshaft.

7. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, two radial inlet ports in said tubular member for introducing fluid into said chamber at a point therein situated between adjacent piston of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, and means interconnecting said pistons with a crankshaft whereby motion of said pistons is transmitted to said crankshaft.

8. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, two radial inlet ports in said tubular member for introducing fluid into said chamber at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, exhaust passages extending tangentially from said tubular casing and interconnecting with said outlet ports in said tubular casing for discharging said expanded fluid outwardly from the outer periphery of said chamber, adjustable venturi means in said exhaust passages to increase the velocity of said discharged fluid, and means interconnecting said pistons with a crankshaft whereby motion of said pistons is transmitted to said crankshaft.

9. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, two radial inlet ports in said tubular member for introducing fluid into said chamber at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, exhaust passages extending tangentially from said tubular casing and interconnecting with said outlet ports in said tubular casing for discharging said expanded fluid outwardly from the outer periphery of said chamber, adjustable venturi means in said exhaust passages to increase the velocity of said discharged fluid, and means interconnecting said pistons with a crankshaft whereby motion of said pistons is transmitted to said crankshaft, the second named means including an ignition means, said fluid being a combustible mixture when fed to said chamber.

10. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, two radial inlet ports in said tubular member for introducing fluid into said chamber at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, exhaust passages extending tangentially from said tubular casing and interconnecting with said outlet ports in said tubular casing for discharging said expanded fluid outwardly from the outer periphery of said chamber, adjustable venturi means in said exhaust passages to increase the velocity of said discharged fluid, and means interconnecting said pistons with a crankshaft whereby motion of said pistons is transmitted to said crankshaft the second means including a fuel injector means, said fluid containing oxygen when fed to said chamber.

11. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, two radial inlet ports in said tubular member for introducing fluid into said chamber at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, exhaust passages extending tangentially from said tubular casing and interconnecting with said outlet ports in said tubular casing for discharging said expanded fluid outwardly from the outer periphery of said chamber, adjustable venturi means in said exhaust passages to increase the velocity of said discharged fluid, a double throw crankshaft rotatably attached to said tubular member and forming an axial extension thereof, and means interconnecting said pistons with said crankshaft whereby motion of said pistons is transmitted to said crankshaft, the second named means including an ignition means, said fluid being a combustible mixture when fed to said chamber.

12. A rotary piston engine comprising a tubular casing, a tubular member coaxially disposed within said casing to define an annular chamber therebetween, a plurality of rotary piston assemblies of the accelerating and decelerating type rotatably movable within said chamber, each assembly being constituted by a pair of piston elements fixedly mounted relative to each other at diametrically opposed positions within said annular chamber and rotatable about the geometric center thereof, two radial inlet ports in said tubular member for introducing fluid into said chamber at a point therein situated between adjacent pistons of different assemblies one of which is moving at a greater velocity than the other thereof thereby causing compression of said introduced fluid, means for expanding said introduced fluid to produce a force accelerating said other piston, outlet ports on said tubular casing in advance of said accelerating piston for expulsion of said expanded fluid from said chamber, exhaust passages extending tangentially from said tubular casing and interconnecting with said outlet ports in said tubular casing for discharging said expanded fluid outwardly from the outer periphery of said chamber, adjustable venturi means in said exhaust passages to increase the velocity of said discharged fluid, a double throw crankshaft rotatably attached to said tubular member and forming an axial extension thereof, and means interconnecting said pistons with said crankshaft whereby motion of said pistons is transmitted to said crankshaft, the second named means including a fuel injector means, said fluid containing oxygen when fed to said chamber.

No references cited.